UNITED STATES PATENT OFFICE.

OSCAR J. LANIGAN, OF CHICAGO, ILLINOIS.

SOLDERING-FLUX.

No. 809,381.  Specification of Letters Patent.  Patented Jan. 9, 1906.

Application filed March 3, 1905. Serial No. 248,323.

*To all whom it may concern:*

Be it known that I, OSCAR J. LANIGAN, a citizen of the United States, residing at Chicago, in the county of Cook and State of Illinois, have invented a certain new, useful, and Improved Soldering-Flux and Process of Making the Same, of which the following is a full, clear, and exact description, such as will enable one skilled in the art to which it appertains to make and use the same.

My invention relates to improvements in soldering-fluxes; and the object of the invention is to provide a non-acid incombustible flux for solder and tin.

Another object of the invention is to provide a liquid soldering-flux which shall flow readily, but which shall be sufficiently viscous to prevent its spreading upon the tinned surfaces.

With these objects in view my invention consists in a novel liquid soldering-flux, comprising red oil, resin, aqua-ammonia, and water, compounded in substantially the manner and proportions hereinafter set forth, the flux being a permanent solution or emulsion of the various ingredients.

The process of manufacturing the flux and the proportions of the ingredients employed are usually as follows: Eleven (11) parts of red oil and eleven (11) parts of resin are placed together in a suitable receptacle and are heated until the resin becomes melted or liquid, whereupon with slight stirring it enters into solution with the red oil. The temperature is maintained at substantially 130° Fahrenheit. Five (5) parts of FFFF ammonia are then admixed with one hundred and one parts of water at about 90° Fahrenheit. The liquid compound of red oil and resin is then stirred into the ammoniated water and forms therewith a permanent solution of emulsion of a light yellow color, thin but somewhat sticky or viscous and slightly soapy in taste and odor.

I do not confine my invention to the exact proportions or the ingredients named, nor to the exact processs of producing the fluid, as the same may be modified to a considerable extent by one skilled in the art. Further, I do not confine my invention to a fluid compound, for the ingredients named may be used to produce a solid or semisolid compound which will serve the purpose.

Having thus described my invention, I claim as new and desire to secure by Letters Patent—

A soldering-flux comprising red oil, resin and ammoniated water, substantially as described.

In testimony whereof I have hereunto set my hand, this 21st day of February, 1905, at Chicago, county of Cook, and State of Illinois, in the presence of two subscribing witnesses.

OSCAR J. LANIGAN.

Witnesses:
CHARLES GILBERT HAWLEY,
E. G. COCHRAN.